United States Patent
Hirokubo (10) Patent No.: US 9,482,857 B2
(45) Date of Patent: Nov. 1, 2016

(54) TUNABLE INTERFERENCE FILTER, OPTICAL MODULE, AND PHOTOMETRIC ANALYZER

(75) Inventor: Nozomu Hirokubo, Fujimi (JP)

(73) Assignee: Seiko Epson Corporation (JP)

( * ) Notice: Subject to any disclaimer, the term of this patent is extended or adjusted under 35 U.S.C. 154(b) by 523 days.

(21) Appl. No.: 13/441,342

(22) Filed: Apr. 6, 2012

(65) Prior Publication Data

US 2012/0257205 A1    Oct. 11, 2012

(30) Foreign Application Priority Data

Apr. 7, 2011   (JP) .................................. 2011-085172

(51) Int. Cl.
G01J 3/45    (2006.01)
G02B 26/00   (2006.01)
G01J 3/26    (2006.01)

(52) U.S. Cl.
CPC .............. *G02B 26/001* (2013.01); *G01J 3/26* (2013.01)

(58) Field of Classification Search
USPC ........ 356/454; 359/260, 263, 317, 318, 578, 359/579
See application file for complete search history.

(56) References Cited

U.S. PATENT DOCUMENTS

| | | | |
|---|---|---|---|
| 5,914,804 A * | 6/1999 | Goossen | 359/291 |
| 6,078,395 A | 6/2000 | Jourdain et al. | |
| 7,515,325 B2 | 4/2009 | Nakamura | |
| 7,525,713 B2 | 4/2009 | Nakamura | |
| 2002/0167730 A1 * | 11/2002 | Needham et al. | 359/578 |
| 2010/0004511 A1 | 1/2010 | Kamihara | |
| 2010/0097613 A1 * | 4/2010 | Saari | 356/454 |
| 2011/0279824 A1 * | 11/2011 | Blomberg et al. | 356/519 |

FOREIGN PATENT DOCUMENTS

| | | |
|---|---|---|
| JP | 11-167076 | 6/1999 |
| JP | 11-307879 | 11/1999 |
| JP | 2002-071562 | 3/2002 |
| JP | 2002-277758 | 9/2002 |

(Continued)

OTHER PUBLICATIONS

Cheng et al, A flexible capacitive tactile sensing array with floating electrodes, J. Mircomech. Microeng. 19 (2009) 115001 (10pp).*

Primary Examiner — Tarifur Chowdhury
Assistant Examiner — Jonathon Cook
(74) *Attorney, Agent, or Firm* — Harness, Dickey & Pierce, P.L.C.

(57) ABSTRACT

A tunable interference filter includes: a first substrate; a second substrate; a first drive electrode provided on the first substrate; a second drive electrode provided on the second substrate; a first detection electrode provided on the first substrate; a second detection electrode provided on the second substrate, wherein the first drive electrode includes a first partial drive electrode and a second partial drive electrode, a first lead drive electrode extending from the first partial drive electrode and a second lead drive electrode extending from the second partial drive electrode are provided on the first substrate, the first detection electrode includes a first partial detection electrode and a second partial detection electrode provided along a virtual circle, a first lead detection electrode extending from the first partial detection electrode and a second lead detection electrode extending from the second partial detection electrode are provided on the first substrate.

18 Claims, 6 Drawing Sheets

(56) References Cited

FOREIGN PATENT DOCUMENTS

| JP | 2007-004074 | 1/2007 |
| JP | 2007-086517 | 4/2007 |
| JP | 2007-219483 | 8/2007 |
| JP | 2007-219484 | 8/2007 |
| JP | 2008-183350 A | 8/2008 |
| JP | 4379457 | 10/2009 |
| JP | 2009-282540 | 12/2009 |
| JP | 2010-224011 | 10/2010 |
| JP | 2010-224572 | 10/2010 |
| JP | 2010-237693 | 10/2010 |
| JP | 2010-237694 | 10/2010 |

\* cited by examiner

TUNABLE INTERFERENCE FILTER, OPTICAL MODULE, AND PHOTOMETRIC ANALYZER

BACKGROUND

1. Technical Field

The present invention relates to a tunable interference filter that acquires a light having a specific wavelength, an optical module, and a photometric analyzer.

2. Related Art

In related art, a tunable interference filter (optical filter device) that extracts a light having a specific wavelength from lights having plural wavelengths has been known (for example, see Patent Document 1 (JP-A-2007-86517)).

The tunable interference filter (tunable filter) disclosed in Patent Document 1 has a movable part being opposed to a substrate, displaceable in its thickness direction, and provided with a movable reflection film, plural drive electrodes and detection electrodes provided on the substrate, and a fixed reflection film provided on the substrate and opposed to the movable reflection film. The substrate has two placement surfaces in different locations in its thickness direction. Of the two placement surfaces, the drive electrodes are provided on one placement surface and the detection electrodes are provided on the other placement surface.

In the tunable interference filter disclosed in Patent Document 1, for detection of capacitances between the detection electrodes and the movable part, it is necessary to perform wiring work on the respectively different substrates for lead wires extending from the detection electrodes and the movable part. Accordingly, when the tunable interference filter is incorporated into a module and the wires are connected, there is a problem that the wiring work is complicated.

SUMMARY

An advantage of some aspects of the invention is to provide a tunable interference filter, an optical module, and a photometric analyzer in which a gap dimension between reflection films can be detected and wires can easily be connected in a simple configuration.

Application Example 1

This application example is directed to a tunable interference filter including a first substrate, a second substrate opposed to the first substrate, a first reflection film provided on the first substrate, a second reflection film provided on the second substrate and opposed to the first reflection film via a gap, an electrostatic actuator including a first drive electrode provided on the first substrate and a second drive electrode provided on the second substrate and opposed to the first drive electrode, and a gap detection electrode including a first detection electrode provided on the first substrate and a second detection electrode provided on the second substrate and opposed to the first detection electrode, wherein the second substrate includes a movable part provided with the second reflection film and a holding part that holds the movable part close to or away from the first substrate, in a plan view of the first substrate and the second substrate as seen from a substrate thickness direction, the movable part is formed in a circular shape and the holding part is formed along an outer circumference of the movable part, the first drive electrode includes a first partial drive electrode and a second partial drive electrode provided along a virtual circle around a center point of the movable part in the plan view, a first lead drive electrode extending from the first partial drive electrode toward an outer peripheral edge of the first substrate and a second lead drive electrode extending from the second partial drive electrode toward the outer peripheral edge of the first substrate are provided on the first substrate, the second drive electrode includes a first opposed drive region overlapping with the first partial drive electrode and a second opposed drive region overlapping with the second partial drive electrode in the plan view, the first detection electrode includes a first partial detection electrode and a second partial detection electrode provided along a virtual circle around the center point of the movable part in the plan view, a first lead detection electrode extending from the first partial detection electrode toward the outer peripheral edge of the first substrate and a second lead detection electrode extending from the second partial detection electrode toward the outer peripheral edge of the first substrate are provided on the first substrate, and the second detection electrode includes a first opposed detection region overlapping with the first partial detection electrode and a second opposed detection region overlapping with the second partial detection electrode in the plan view.

In the application example, the first drive electrode formed on the first substrate includes the first partial drive electrode and the second partial drive electrode insulated from each other, and the first lead drive electrode is connected to the first partial drive electrode and the second lead drive electrode is connected to the second partial drive electrode. Further, the second drive electrode formed on the second substrate includes the first opposed drive region opposed to the first partial drive electrode and the second opposed drive region opposed to the second partial drive electrode.

The first detection electrode formed on the first substrate includes the first partial detection electrode and the second partial detection electrode insulated from each other and the first lead detection electrode is connected to the first partial detection electrode and the second lead detection electrode is connected to the second partial detection electrode. Further, the second detection electrode formed on the second substrate includes the first opposed detection region opposed to the first partial detection electrode and the second opposed detection region opposed to the second partial detection electrode.

In the configuration, when a voltage is applied between the first lead drive electrode and the second lead drive electrode, voltages are respectively applied between the first partial drive electrode and the first opposed drive region of the second drive electrode and between the second partial drive electrode and the second opposed drive region of the second drive electrode. Thereby, by electrostatic attractive forces generated between the electrodes, at least one of the first substrate and the second substrate can be deflected toward the other substrate and the dimension of the gap between the first reflection film and the second reflection film may be changed.

Further, the first partial detection electrode and the first opposed detection region of the second detection electrode opposed to the first partial detection electrode form a first partial capacitance. The second partial detection electrode and the second opposed detection region of the second detection electrode opposed to the second partial detection electrode form a second partial capacitance. The first partial capacitance and the second partial capacitance take values inversely proportional to the gaps. The first partial capacitance and the second partial capacitance are electrically series-connected by the second detection electrode. The gap may be detected by measurement of the capacitance between the first lead drive electrode and the second lead drive electrode.

Furthermore, the first lead drive electrode, the second lead drive electrode, the first lead detection electrode, and the second lead detection electrode are formed on the first substrate, and thus, when the tunable interference filter is incorporated into an optical module such as a sensor main body, it is only necessary to perform wiring work on the respective lead electrodes formed on the first substrate, and the work efficiency may be improved.

In addition, for example, in the case where the lead electrodes are formed on both the first substrate and the second substrate and the first substrate is fixed to a fixing part of the optical module, and the wiring work is performed on the lead electrodes, when the wires are connected to the lead electrodes of the second substrate, stress may be applied in a direction in which the second substrate is separated from the first substrate. In this case, the first substrate and the second substrate may be separated and the substrates may be deflected and the gap between the reflection films may be varied. If wiring is performed with a weak force for prevention of the separation and the deflection of the substrates, wiring reliability may be lower.

On the other hand, in the application example, the first lead drive electrode, the second lead drive electrode, the first lead detection electrode, and the second lead detection electrode are formed only on the first substrate, and thus, for example, in the case where the wiring work is performed with the first substrate fixed to the fixing part of the optical module, no stress is applied to the second substrate and inconveniences of separation, substrate deflection, etc. may be prevented, and sufficient wiring reliability may be obtained.

Application Example 2

In the tunable interference filter according to the above application example, it is preferable that the first detection electrode and the first reflection film are provided on the same plane and the second detection electrode and the second reflection film are provided on the same plane.

In this application example, the first detection electrode and the first reflection film are provided on the same plane and the second detection electrode and the second reflection film are provided on the same plane. In the configuration, the gap between the first reflection film and the second reflection film and the gap between the first detection electrode and the second detection electrode may be equal, and the gap between the reflection films may be detected with high accuracy.

Application Example 3

In the tunable interference filter according to the above application example, it is preferable that the first partial detection electrode has an arc shape along a first virtual circle, and the second partial detection electrode has an arc shape along the first virtual circle, and is formed in the same shape as that of the first partial detection electrode and provided in a location in point symmetry with the first partial detection electrode with respect to the center point of the movable part in the plan view.

In this application example, the first partial detection electrode and the second partial detection electrode are provided along the same first virtual circle in the locations in point symmetry with each other. In the configuration, when the gap between the substrates is not uniform, that is, when the gap 1 between the first partial detection electrode and the first opposed detection region of the second detection electrode and the gap 2 between the second partial detection electrode and the second opposed detection region of the second detection electrode are different, the series-composite capacitance of the first partial capacitance and the second partial capacitance is inversely proportional to the sum of the gap 1 and the gap 2, and the gaps may easily be detected by detection of the series-composite capacitance.

Application Example 4

This application example is directed to an optical module including the above described tunable interference filter, and a detection unit that detects light extracted by the tunable interference filter.

In this application example, the optical module includes the above described tunable interference filter. In the tunable interference filter, as described above, the wiring work may easily be performed when the optical module is incorporated and the wiring reliability may be improved. Therefore, also, in the optical module, the tunable interference filter may easily be incorporated, and manufacturing efficiency may be improved and the wiring reliability may be improved.

Further, since the gap of the tunable interference filter may be measured by a simple configuration, also, in the optical module, the wavelength of the extracted light may be controlled with high accuracy and an accurate amount of light to be measured may be measured.

Application Example 5

This application example is directed to a photometric analyzer including the above described optical module, and an analytical processing unit that analyzes light properties of the light based on the light detected by the detection unit of the optical module.

Here, as the photometric analyzer, photometric equipment that analyzes chromaticity and brightness of the light entering the optical module based on electric signals output from the optical module, a gas detector that checks types of gas by detecting an absorption wavelength of the gas, and an optical communication device that acquires from received light data contained in the light having the wavelength or the like may be exemplified.

In this application example, the photometric analyzer includes the above described optical module. The optical module has the high wiring reliability as described above, and thus, high reliability may be obtained in the photometric analyzer including the optical module.

Further, the photometric analyzer may measure the accurate amount of light of the light to be measured by the optical module, and thus, a photometric analyzing process with high accuracy may be implemented using the measured amount of light.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

As below, the first embodiment according to the invention will be explained with reference to the drawings.

1. Overall Configuration of Colorimetric Instrument

Figure 1:
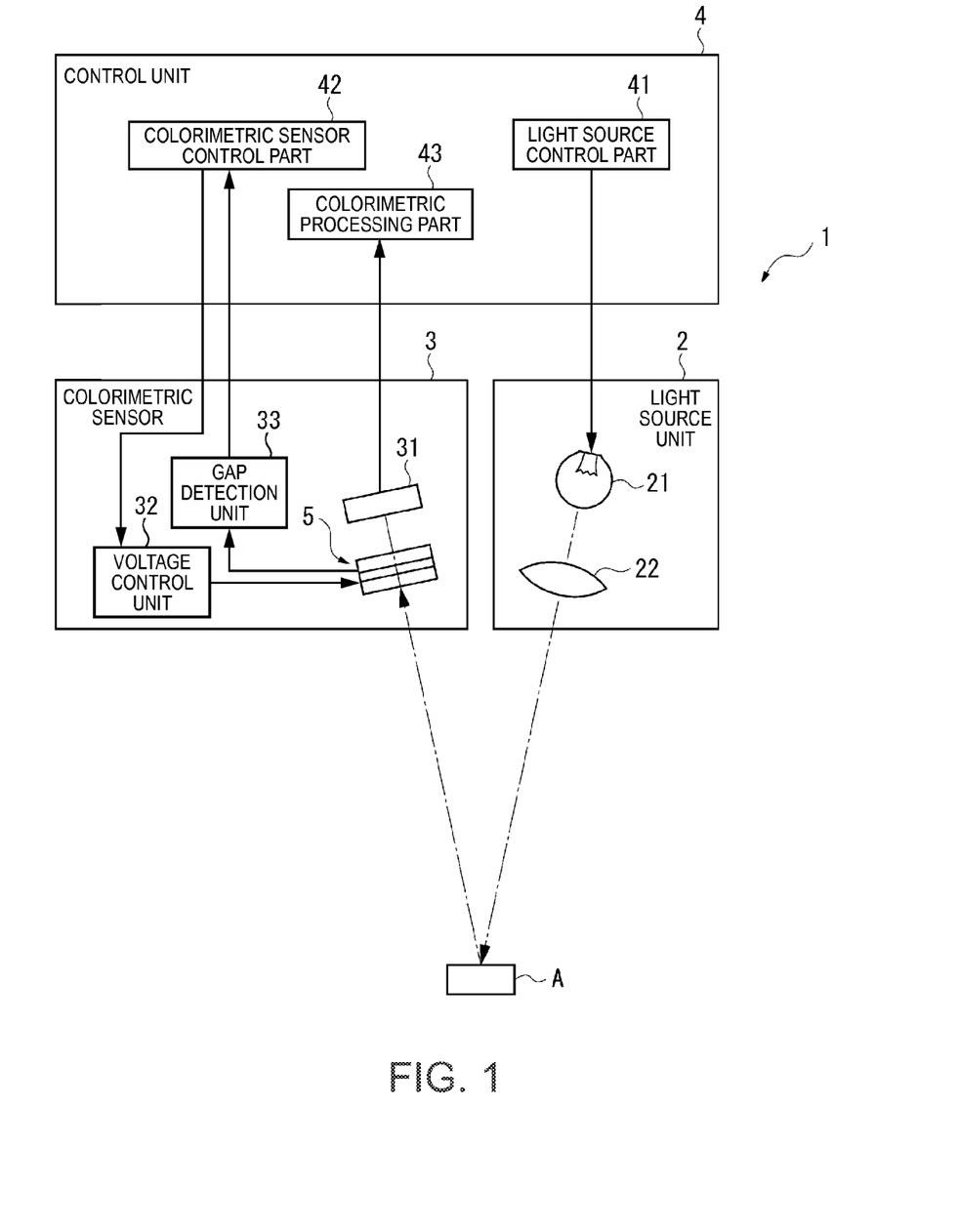
FIG. 1 shows a schematic configuration of a colorimetric instrument (photometric analyzer) of the first embodiment according to the invention.

FIG. 1 shows a schematic configuration of a colorimetric instrument (photometric analyzer) of the embodiment according to the invention.

The colorimetric instrument 1 is a photometric analyzer according to the invention, and includes a light source unit 2 that outputs light to a test object A, a colorimetric sensor 3 as an optical module according to the invention, and a control unit 4 that controls the entire operation of the colorimetric instrument 1 as shown in FIG. 1. Further, the colorimetric instrument 1 is a device that reflects light output from the light source unit 2 on the test object A, receives the reflected test object light in the colorimetric sensor 3, and analyzes and measures the chromaticity of the test object light, i.e., the color of the test object A based on the detection signal output from the colorimetric sensor 3.

2. Configuration of Light Source Unit

The light source unit 2 includes a light source 21 and plural lenses 22 (only one is shown in FIG. 1), and outputs white light to the test object A. The plural lenses 22 may include a collimator lens, and, in this case, the light source unit 2 brings the white light output from the light source 21 into parallel light by the collimator lens and outputs it from a projection lens (not shown) toward the test object A.

Note that, in the embodiment, the colorimetric instrument 1 including the light source unit 2 is exemplified, however, for example, in the case where the test object A is a light emitting member such as a liquid crystal panel, the light source unit 2 may not be provided.

3. Configuration of Colorimetric Sensor

The colorimetric sensor 3 forms an optical module according to the invention. The colorimetric sensor 3 includes a tunable interference filter 5, a detection unit 31 that receives and detects light transmitted through the tunable interference filter 5, a voltage control unit 32 that applies a drive voltage to the tunable interference filter 5, and a gap detection unit 33 that detects a gap of the tunable interference filter 5 as shown in FIG. 1. Further, the colorimetric sensor 3 includes an incidence optical lens (not shown) that guides the reflected light (test object light) reflected on the test object A inward in a location facing the tunable interference filter 5. Furthermore, the colorimetric sensor 3 spectroscopically separates only light having a predetermined wavelength of the test object lights entering from the incidence optical lens by the tunable interference filter 5, and receives the spectroscopically separated light by the detection unit 31.

The detection unit 31 includes plural photoelectric conversion elements and generates electric signals in response to amounts of received light. Further, the detection unit 31 is connected to the control unit 4, and outputs the generated electric signals as light reception signals to the control unit 4.

3-1. Configuration of Tunable Interference Filter

Figure 2:
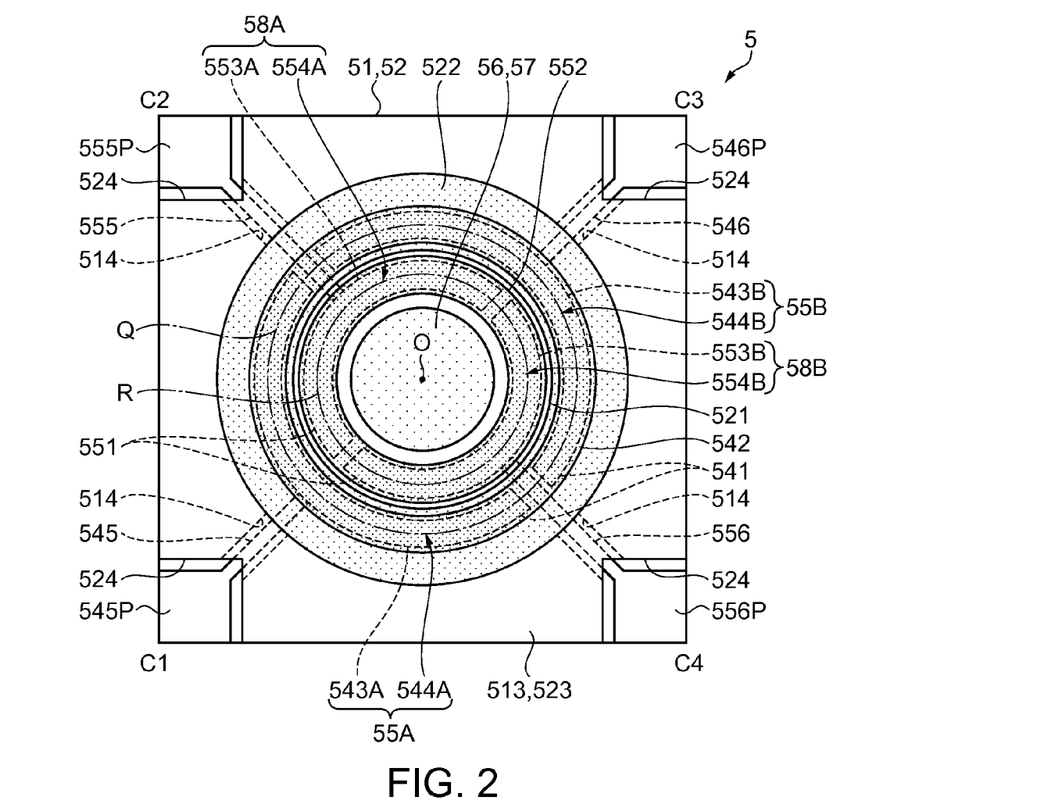
FIG. 2 is a plan view showing a schematic configuration of a tunable interference filter of the first embodiment.
Figure 3:
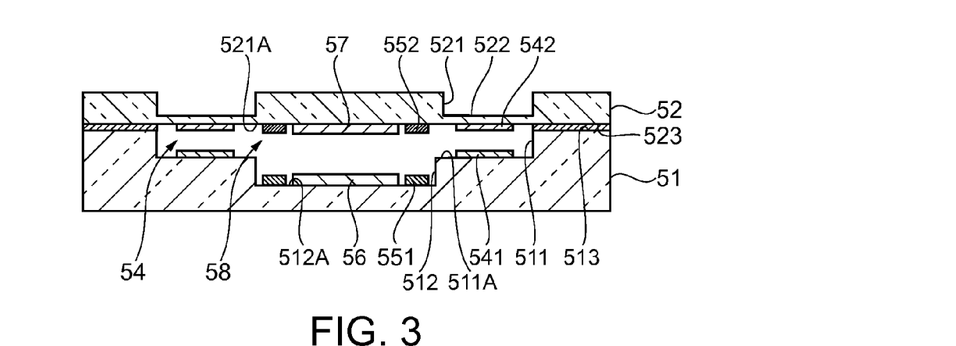
FIG. 3 is a sectional view of the tunable interference filter of the first embodiment.

FIG. 2 is a plan view showing a schematic configuration of the tunable interference filter 5, and FIG. 3 is a sectional view of the tunable interference filter 5.

The tunable interference filter 5 is a plate-like optical member having a square shape in the plan view as shown in FIG. 2. The tunable interference filter 5 includes a fixed substrate 51 as a first substrate according to the invention, and a movable substrate 52 as a second substrate according to the invention as shown in FIG. 3. These two substrates 51, 52 are formed using various kinds of glass of soda glass, crystalline glass, quartz glass, lead glass, potassium glass, borosilicate glass, alkali-free glass, etc. or quartz. Further, the two substrates 51, 52 are integrally formed by bonding parts 513, 523 formed near the outer peripheral parts bonded by surface activated bonding or siloxane bonding using a plasma-polymerized film, for example.

A fixed reflection film 56 forming a first reflection film according to the invention is provided on the fixed substrate 51 and a movable reflection film 57 forming a second reflection film according to the invention is provided on the movable substrate 52. Here, the fixed reflection film 56 is fixed to the surface of the fixed substrate 51 facing the movable substrate 52, and the movable reflection film 57 is fixed to the surface of the movable substrate 52 facing the fixed substrate 51. Furthermore, the fixed reflection film 56 and the movable reflection film 57 are oppositely provided via a gap.

In addition, an electrostatic actuator 54 for adjustment of the dimension of the gap between the fixed reflection film 56 and the movable reflection film 57 is provided between the fixed substrate 51 and the movable substrate 52. The electrostatic actuator 54 has a fixed electrode 541 as a first drive electrode provided at the fixed substrate 51 side and a movable drive electrode 542 as a second drive electrode provided at the movable substrate 52 side.

Further, a gap detection sensor 58 for detecting the gap between the fixed reflection film 56 and the movable reflection film 57 is provided between the fixed substrate 51 and the movable substrate 52. The gap detection sensor 58 includes a fixed detection electrode 551 as a first detection electrode according to the invention provided at the fixed substrate 51 side and a movable detection electrode 552 as a second detection electrode according to the invention provided at the movable substrate 52 side.

3-1-1. Configuration of Fixed Substrate

Figure 4:
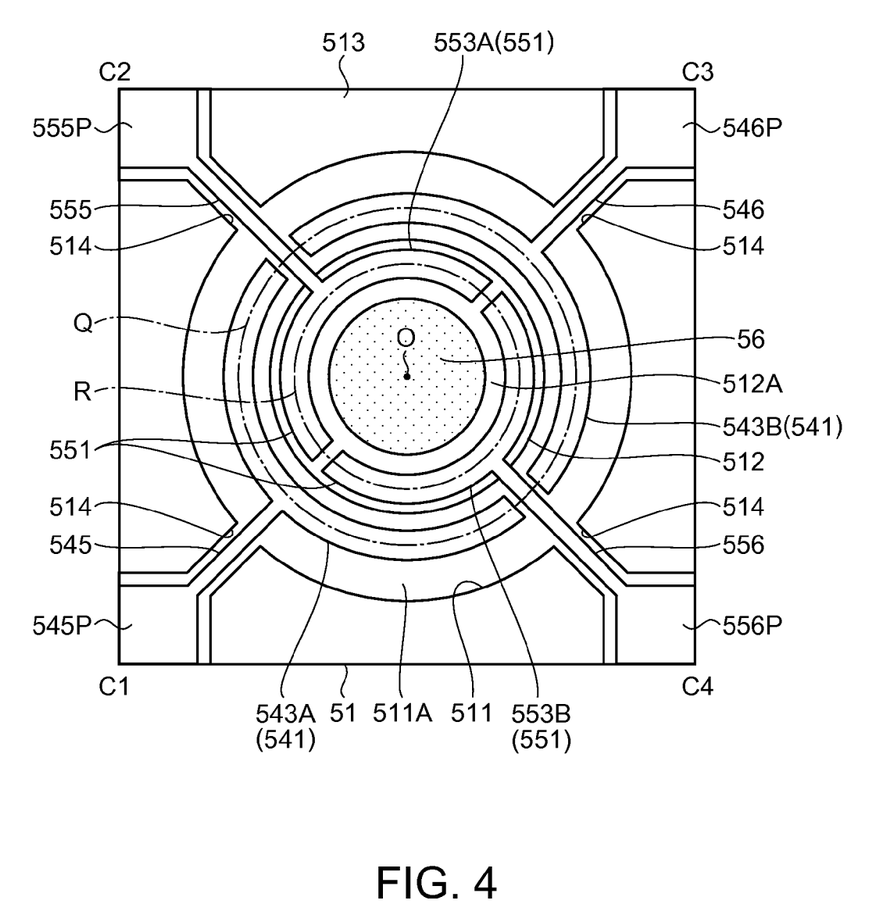
FIG. 4 is a plan view of a fixed substrate of the tunable interference filter of the first embodiment as seen from a movable substrate side.

FIG. 4 is a plan view of the fixed substrate 51 in the tunable interference filter 5 of the first embodiment as seen from the movable substrate 52 side.

The fixed substrate 51 is formed by processing a glass base material formed in a thickness of 500 µm, for example. Specifically, on the fixed substrate 51, an electrode formation groove 511 and a reflection film fixing part 512 are formed by etching as shown in FIG. 3. In the fixed substrate 51, a thickness dimension is formed larger than that of the movable substrate 52, and there is no electrostatic attractive force when a voltage is applied between the fixed electrode 541 and the movable drive electrode 542 or deflection of the fixed substrate 51 due to internal stress of the fixed electrode 541.

As shown in FIG. 4, the electrode formation groove 511 is formed in a circular shape around a planar center point of the fixed substrate 51 in a plan view. The reflection film fixing part 512 is formed to project from the center part of the electrode formation groove 511 toward the movable substrate 52 side in the plan view.

Further, a pair of electrode lead grooves 514 extending from the electrode formation groove 511 toward apexes C1, C3 of the outer peripheral edge of the fixed substrate 51 are provided on the fixed substrate 51.

Furthermore, the fixed electrode 541 is formed on an electrode formation surface 511A as a groove bottom part of the electrode formation groove 511 of the fixed substrate 51.

As shown in FIG. 4, the fixed electrode 541 includes a pair of fixed partial electrodes (a first fixed partial electrode 543A forming a first partial drive electrode and a second fixed partial electrode 543B forming a second partial drive electrode) having arc shapes provided on the circumference of a virtual circle Q around the center point O of the fixed reflection film 56.

These fixed partial electrode 543A, 543B are respectively formed in arc shapes nearly having the same semicircular planar shape in a plan view as seen from the substrate thickness direction, and formed in the same thickness dimension. The width dimensions (distances between the inner diameter parts and the outer diameter parts of the arcs) of the respective fixed partial electrodes 543A, 543B are uniform. Further, the fixed partial electrodes 543A, 543B are provided in point symmetry with each other with respect to the center point O on the circumference of the virtual circle Q around the center point O of the fixed reflection film 56 in the plan view.

Furthermore, the fixed substrate 51 includes a first lead drive electrode 545 extending from the first fixed partial electrode 543A and a second lead drive electrode 546 extending from the second fixed partial electrode 543B.

The first lead drive electrode 545 is formed from the outer peripheral edge of the first fixed partial electrode 543A along the electrode lead groove 514 extended in the direction toward the apex C1 of the fixed substrate 51 in FIG. 4, and a first drive electrode pad 545P connected to the voltage control unit 32 is provided at the end thereof.

Further, the second lead drive electrode 546 is formed from the outer peripheral edge of the second fixed partial electrode 543B along the electrode lead groove 514 extended in the direction toward the apex C3 of the fixed substrate 51 in FIG. 4, and a second drive electrode pad 546P connected to the voltage control unit 32 is provided at the end thereof.

Furthermore, insulating films (not shown) for preventing discharge between the fixed electrode 541 and the movable electrode 542 are stacked on the fixed partial electrodes 543A, 543B.

As described above, the reflection film fixing part 512 is formed in a cylindrical concave groove shape having a diameter dimension smaller than that of the electrode formation groove 511 coaxially with the electrode formation groove 511. Note that, in the embodiment, as shown in FIG. 3, the example in which a reflection film fixing surface 512A of the reflection film fixing part 512 facing the movable substrate 52 is formed farther from the movable substrate 52 than the electrode formation surface 511A, however, not limited to that. The height locations of the electrode formation surface 511A and the reflection film fixing surface 512A are appropriately set depending on the dimension of the gap between the fixed reflection film 56 fixed to the reflection film fixing surface 512A and the movable reflection film 57 formed on the movable substrate 52, the dimension between the fixed electrode 541 and the movable drive electrode 542, and the thickness dimensions of the fixed reflection film 56 and the movable reflection film 57. Therefore, for example, a configuration in which the electrode formation surface 511A and the reflection film fixing surface 512A are formed on the same plane or a configuration in which a reflection film fixing groove having a cylindrical convex columnar shape is formed in the center part of the electrode formation surface 511A and the reflection film fixing surface is formed on the bottom surface of the reflection film fixing groove may be employed.

Further, the fixed reflection film 56 formed in a circular shape is fixed to the reflection film fixing surface 512A. The fixed reflection film 56 may be formed by a single-layer film of a metal, may be formed by a dielectric multilayer film, or may be formed by a dielectric multilayer film with an Ag alloy formed thereon. As the metal single-layer film, for example, a single-layer film of an Ag alloy may be used, and, in the case of the dielectric multilayer film, for example, a dielectric multilayer film with a high-refractive-index layer of $TiO_2$ and a low-refractive-index layer of $SiO_2$ may be used.

Furthermore, a fixed detection electrode 551 according to the invention is fixed to the reflection film fixing surface 512A.

As shown in FIG. 4, the fixed detection electrode 551 includes a pair of fixed partial detection electrodes (a first fixed partial detection electrode 553A forming a first partial detection electrode according to the invention and a second fixed partial detection electrode 553B forming a second partial detection electrode according to the invention) having arc shapes and provided on the circumference of a virtual circle R around the center point O of the fixed reflection film 56.

These fixed partial detection electrodes 553A, 553B are respectively formed in arc shapes nearly having the same semicircular planar shape in a plan view as seen from the substrate thickness direction, and formed in the same thickness dimension. The width dimensions (distances between the inner diameter parts and the outer diameter parts of the arcs) of the respective fixed partial detection electrodes 553A, 553B are uniform. Further, the fixed partial detection electrodes 553A, 553B are provided in point symmetry with each other with respect to the center point O on the circumference of the virtual circle R around the center point O of the fixed reflection film 56.

Furthermore, the fixed substrate 51 includes a first lead detection electrode 555 extending from the first fixed partial detection electrode 553A and a second lead detection electrode 556 extending from the second fixed partial detection electrode 553B.

The first lead detection electrode 555 is formed from the outer peripheral edge of the first fixed partial detection electrode 553A along the electrode lead groove 514 extended toward the apex C2 of the fixed substrate 51 in FIG. 4, and a first detection electrode pad 555P connected to the gap detection unit 33 is provided at the end thereof.

Further, the second lead drive electrode 556 is formed from the outer peripheral edge of the second fixed partial detection electrode 553B along the electrode lead groove 514 extended toward the apex C4 of the fixed substrate in FIG. 4, and a second detection electrode pad 556P connected to the gap detection unit 33 is provided at the end thereof.

Furthermore, in the fixed substrate 51, an anti-reflection film (not shown) is formed in a location corresponding to the fixed reflection film 56 on the opposite surface to the surface facing the movable substrate 52. The anti-reflection film is formed by alternately stacking a low-refractive-index film and a high-refractive-index film for reduction of reflectance and increase of transmittance of the visible light on the surface of the fixed substrate 51.

3-1-2. Configuration of Movable Substrate

Figure 5:
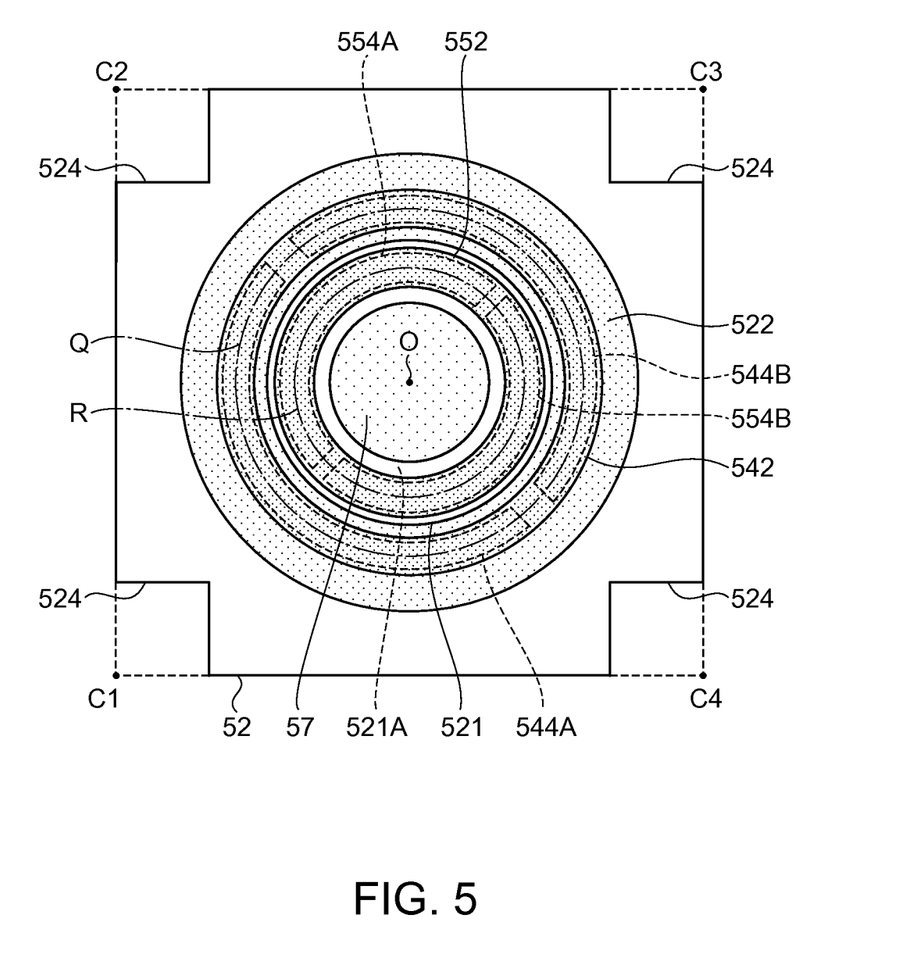
FIG. 5 is a plan view of a movable substrate of the tunable interference filter of the first embodiment as seen from a fixed substrate side.

FIG. 5 is a plan view of the movable substrate 52 in the tunable interference filter 5 of the first embodiment as seen from the fixed substrate 51 side.

The movable substrate 52 is formed by processing a glass base material formed in a thickness of 200 µm, for example, by etching.

Specifically, the movable substrate 52 includes a movable part 521 having a circular shape around a substrate center point and a holding part 522 that is coaxial with the movable part 521 and holds the movable part 521 in plan views as shown in FIGS. 2 and 5.

Further, the movable substrate 52 has cutout parts 524 in locations corresponding to the first drive electrode pad 545P, the second drive electrode pad 546P, the first detection electrode pad 555P, and the second detection electrode pad 556P as shown in FIGS. 2 and 5. In the configuration, the electrode pads 545P, 546P, 555P, 556P are exposed on the surface of the tunable interference filter 5 as seen from the movable substrate 52.

The movable part 521 is formed to have a thickness dimension larger than that of the holding part 522, and, for example, in the embodiment, formed to have the same dimension of 200 µm as the thickness dimension of the movable substrate 52. Further, the movable part 521 has a movable surface 521A in parallel to the reflection film fixing part 512, and the movable reflection film 57 opposed to the fixed reflection film 56 via a gap is fixed to the movable surface 521A.

Here, for the movable reflection film 57, a reflection film having the same configuration as that of the above described fixed reflection film 56 is used.

Further, a movable detection electrode 552 according to the invention opposed to the fixed detection electrode 551 via a gap is fixed to the movable surface 521A.

As shown in FIG. 5, the movable detection electrode 552 is formed in an annular shape along the virtual circle R such that a width dimension as a difference between the inner diameter dimension and the outer diameter dimension is the same width dimension along the circumference direction of the virtual circle R. Here, in the plan view as seen from the substrate thickness direction as shown in FIG. 2, the movable detection electrode 552 is formed in an annular shape including a first opposed detection region 554A overlapping with the first fixed partial detection electrode 553A and a second opposed detection region 554B overlapping with the second fixed partial detection electrode 553B. Further, the first fixed partial detection electrode 553A and the first opposed detection region 554A of the movable detection electrode 552 form a first partial gap detection sensor 58A, and the second fixed partial detection electrode 553B and the second opposed detection region 554B of the movable detection electrode 552 form a second partial gap detection sensor 58B.

Furthermore, in the movable part 521, an anti-reflection film (not shown) is formed in a location corresponding to the movable reflection film 57 on the opposite surface to the movable surface 521A. The anti-reflection film has the same configuration as that of the anti-reflection film formed on the fixed substrate 51 and is formed by alternately stacking a low-refractive-index film and a high-refractive-index film.

The holding part 522 is a diaphragm surrounding the movable part 521, and formed in a thickness dimension of 50 µm, for example, and having stiffness smaller than that of the movable part 521 in the thickness direction.

Accordingly, the holding part 522 is more liable to deflection than the movable part 521, and may be deflected toward the fixed substrate 51 side by a small electrostatic attractive force. In this regard, since the movable part 521 has a larger thickness dimension and larger stiffness than those of the holding part 522, even when a force of deflecting the movable substrate 52 acts thereon by the electrostatic attractive force, there is little deflection of the movable part 521 and the deflection of the movable reflection film 57 formed in the movable part 521 may be prevented.

Further, a movable drive electrode 542 opposed to the fixed electrode 541 via a gap of about 1 µm in the initial state is fixed to the surface of the holding part 522 facing the fixed substrate 51.

As shown in FIG. 5, the movable drive electrode 542 is formed in an annular shape along the virtual circle Q such that a width dimension as a difference between the inner diameter dimension and the outer diameter dimension is the same width dimension along the circumference direction of the virtual circle Q. Here, in the plan view as seen from the substrate thickness direction as shown in FIG. 2, the movable drive electrode 542 is formed in an annular shape including a first opposed drive region 544A overlapping with the first fixed partial electrode 543A and a second opposed drive region 544B overlapping with the second fixed partial electrode 543B. Further, the first fixed partial electrode 543A and the first opposed drive region 544A of the movable drive electrode 542 form a first partial actuator 55A, and the second fixed partial electrode 543B and the second opposed drive region 544B of the movable drive electrode 542 form a second partial actuator 55B.

3-1-3. Configuration of Electrostatic Actuator

Figure 6:
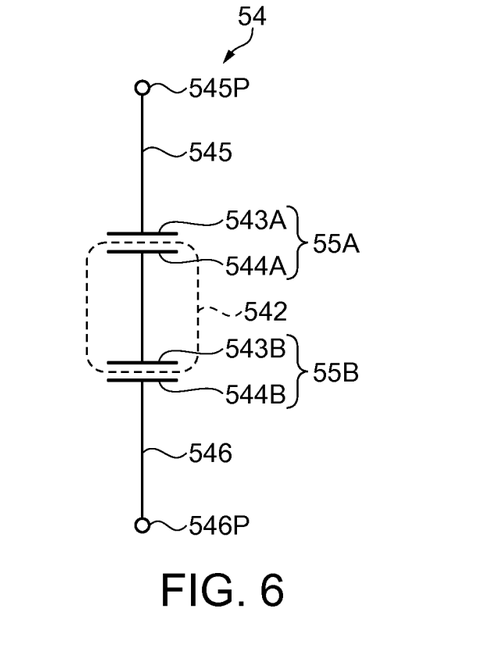
FIG. 6 is a wiring diagram of an electrostatic actuator of the first embodiment.

FIG. 6 is a wiring diagram of the electrostatic actuator 54 of the first embodiment.

As described above, the electrostatic actuator 54 has the first partial actuator 55A including the first fixed partial electrode 543A and the first opposed drive region 544A of the movable drive electrode 542, and the second partial actuator 55B including the second fixed partial electrode 543B and the second opposed drive region 544B of the movable drive electrode 542.

In the electrostatic actuator 54, when a drive voltage V is applied between the first drive electrode pad 545P of the first lead drive electrode 545 and the second drive electrode pad 546P of the second lead drive electrode 546, divided voltages $V_1$, $V_2$ in response to capacitive reactances are applied to the respective partial actuators 55A, 55B.

Further, the respective partial actuators 55A, 55B are formed in the same shape and provided at equal angle intervals (180 degrees) on the virtual circle Q in the plan view of the tunable interference filter 5 as seen from the substrate thickness direction. Therefore, given that the dimensions between the electrodes (gaps between electrodes) in the respective partial actuators 55A, 55B are $d_1$, $d_2$, respectively, and the areas of the first and second fixed partial electrodes 543A, 543B, the first opposed drive region 544A, and the second opposed drive region 544B are $S_D$, and permittivity is $\in$, the capacitances $C_{D1}$, $C_{D2}$ of the respective partial actuators 55A, 55B are expressed by the following equations (1) and (2), respectively.

$$C_{D1} = \epsilon S_D / d_1 \tag{1}$$

$$C_{D2} = \epsilon S_D / d_2 \tag{2}$$

Here, the respective partial actuators 55A, 55B are electrically series-connected, and the charge amounts Q held in the partial actuators 55A, 55B take the same value and the following equation (3) holds.

$$Q = C_{D1} V_1 = C_{D2} V_2 \tag{3}$$

On the other hand, the electrostatic attractive forces $F_1$, $F_2$ acting on the respective partial actuators 55A, 55B are products $E_1 Q$, $E_2 Q$ of the electric fields $E_1$, $E_2$ between the respective partial actuators 55A, 55B and the charge amounts Q held in the respective partial actuators 55A, 55B.

Therefore, the electrostatic attractive forces $F_1$, $F_2$ may be expressed by the following equations (4) and (5) by substitution of the above equations (1) to (3).

$$F_1 = E_1 Q = Q^2 / \epsilon S_D \tag{4}$$

$$F_2 = E_2 Q = Q^2 / \epsilon S_D \tag{5}$$

That is, as expressed by the equations (4) and (5), the electrostatic attractive forces $F_1$, $F_2$ acting on the respective partial actuators 55A, 55B take the same value regardless of the values of the gaps $d_1$, $d_2$ between partial electrodes.

Therefore, for example, in the initial gaps, even when there is a slight difference without affecting the measurement accuracy between the values of the gaps $d_1$, $d_2$ between partial electrodes, for example, and a voltage is applied to the electrostatic actuator 54, the difference between the gaps $d_1$, $d_2$ between partial electrodes does not become larger and the holding part 522 may uniformly be deflected.

3-1-4. Configuration of Gap Detection Sensor

Figure 7:
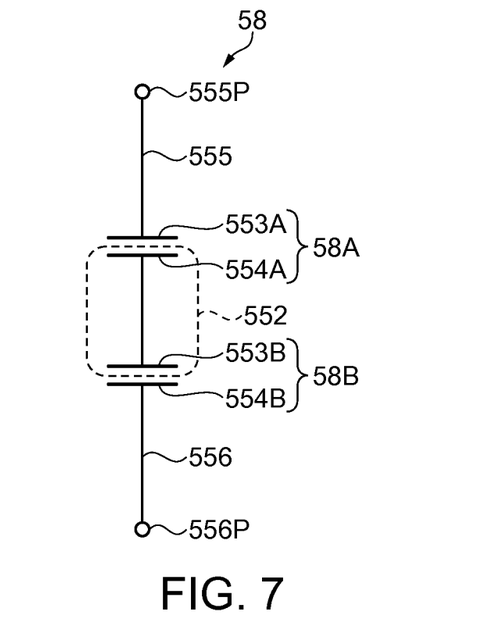
FIG. 7 is a wiring diagram of a gap detection sensor of the first embodiment.

FIG. 7 is a wiring diagram of the gap detection sensor 58 of the first embodiment.

As described above, the gap detection sensor 58 has the first partial gap detection sensor 58A including the first fixed partial detection electrode 553A and the first opposed detection region 554A of the movable detection electrode 552, and the second partial gap detection sensor 58B including the second fixed partial detection electrode 553B and the second opposed detection region 554B of the movable detection electrode 552.

The respective partial gap detection sensors 58A, 58B are formed in the same shape and provided at equal angle intervals (180 degrees) on the virtual circle R in the plan view of the tunable interference filter 5 as seen from the substrate thickness direction. Therefore, given that the dimensions between the detection electrodes (gaps between detection electrodes) in the respective partial gap detection sensors 58A, 58B are $h_1$, $h_2$, respectively, and the areas of the first and second fixed partial detection electrodes 553A, 553B, the first opposed detection region 554A, and the second opposed detection region 554B are $S_S$, and permittivity is $\epsilon$, the capacitances $C_{S1}$, $C_{S2}$ of the respective partial gap detection sensors 58A, 58B are expressed by the following equations (6) and (7), respectively.

$$C_{S1} = \epsilon S_S / h_1 \tag{6}$$

$$C_{S2} = \epsilon S_S / h_2 \tag{7}$$

In the gap detection sensor 58, the capacitance $C_s$ between the first detection electrode pad 555P of the first lead detection electrode 555 and the second detection electrode pad 556P of the second lead detection electrode 556 is expressed by the following equation (8).

$$C_s = C_{S1} C_{S2} / (C_{S1} + C_{S2}) = \epsilon S_S / (h_1 + h_2) \tag{8}$$

Further, the average dimension h between the detection electrodes is expressed by the following equation (9).

$$h = (h_1 + h_2) / 2 = \epsilon S_S / 2 C_s \tag{9}$$

Therefore, by measuring the capacitance $C_s$ between the first detection electrode pad 555P of the first lead detection electrode 555 and the second detection electrode pad 556P of the second lead detection electrode 556, the average dimension h between the detection electrodes may be detected.

Note that, in the embodiment, the first detection electrode and the first reflection film are provided on the same plane and the second detection electrode and the second reflection film are provided on the same plane. Accordingly, the gap between the first reflection film and the second reflection film and the gap between the first detection electrode and the second detection electrode are equal, and the gap between the reflection films may be detected with high accuracy.

3-1-5. Wiring for Tunable Interference Filter

Figure 8:
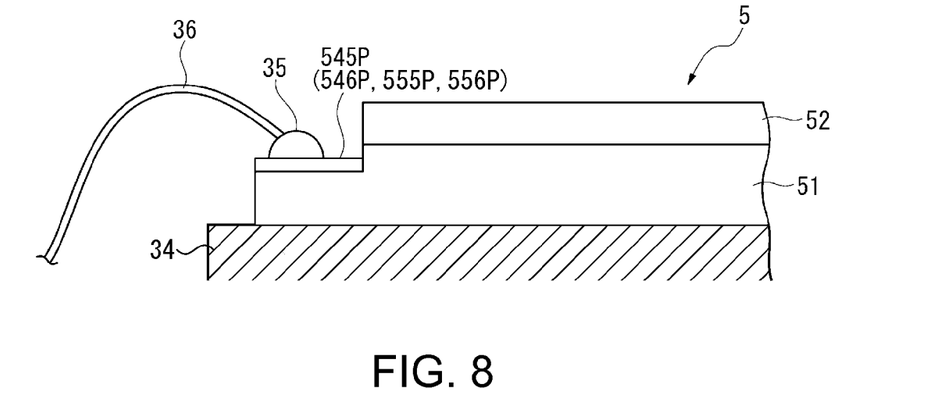
FIG. 8 shows a wiring structure when the tunable interference filter is incorporated into a colorimetric sensor.
Figure 9:
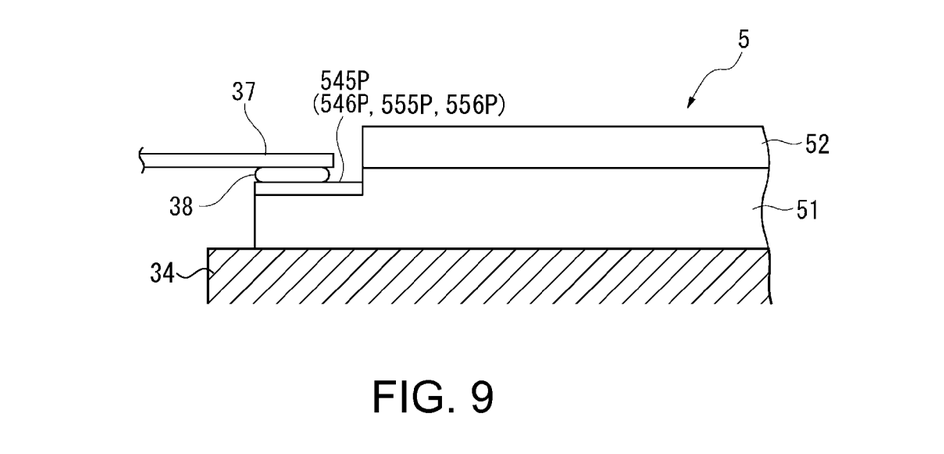
FIG. 9 shows another example of the wiring structure when the tunable interference filter is incorporated into the colorimetric sensor.

FIG. 8 shows a wiring structure when the tunable interference filter 5 is incorporated into the colorimetric sensor 3. FIG. 9 shows another example of the wiring structure when the tunable interference filter 5 is incorporated into the colorimetric sensor 3.

When the tunable interference filter 5 is incorporated into the colorimetric sensor 3, generally, the tunable interference filter 5 is fixed directly to a filter fixing substrate provided in the colorimetric sensor 3 or the tunable interference filter 5 is held in a case and the case may be fixed to the filter fixing substrate.

Further, in the case where the electrode pads 545P, 546P of the tunable interference filter 5 are connected to the voltage control unit 32 of the colorimetric sensor 3 and in the case where the electrode pads 555P, 556P of the tunable interference filter 5 are connected to the gap detection unit 33 of the colorimetric sensor 3, wiring is provided with the tunable interference filter 5 fixed to a fixing part 34.

In this regard, as a wiring method for the tunable interference filter 5, for example, as shown in FIG. 8, a conducting member 35 of molten Ag paste or the like is provided on the electrode pads 545P, 546P, 555P, 556P, and a lead wire 36 is connected from the movable substrate 52 side of the tunable interference filter 5 before solidification of the conducting member 35. In this case, in the wiring work, the lead wire 36 may easily be connected from the movable substrate 52 side of the tunable interference filter 5.

Further, as another wiring method for the tunable interference filter 5, for example, as shown in FIG. 9, an FPC 37 (Flexible Printed Circuit) may be connected via an anisotropic conducting layer 38 such as an anisotropic conductive film (ACF) or anisotropic conductive paste (ACP). In this case, the anisotropic conducting layers 38 are formed on electrode pads 545P, 546P, 555P, 556P and the FPCs 37 are formed thereon, and then, the FPCs 37 are pressed from the movable substrate 52 side of the tunable interference filter 5. Also, in this case, no stress is applied to the movable substrate 52, and thus, there is no separation between the fixed substrate 51 and the movable substrate 52 or deflection of the movable substrate 52, and performance of the tunable interference filter 5 may be maintained.

3-2. Configuration of Voltage Control Unit

The voltage control unit 32 controls the voltage applied to the electrostatic actuator 54 based on the control signal input from the control unit 4.

3-3. Configuration of Gap Detecting Unit

The gap detection unit 33 detects the capacitance of the gap detection sensor 58 of the tunable interference filter 5 and outputs a detection signal to the control unit 4.

4. Configuration of Control Unit

The control unit 4 controls the entire operation of the colorimetric instrument 1.

As the control unit 4, for example, a general-purpose personal computer, a portable information terminal, and additionally, a colorimetry-dedicated computer or the like may be used.

Further, the control unit 4 includes a light source control part 41, a colorimetric sensor control part 42, a colorimetric processing part 43 forming an analytical processing unit according to the invention, etc. as shown in FIG. 1.

The light source control part 41 is connected to the light source unit 2. Further, the light source control part 41 outputs a predetermined control signal to the light source unit 2 based on the setting input by a user, for example, and allows the light source unit 2 to output white light with predetermined brightness.

The colorimetric sensor control part 42 is connected to the colorimetric sensor 3. Further, the colorimetric sensor control part 42 sets the wavelength of light to be received by the colorimetric sensor 3 based on the setting input by a user, for example, and outputs a control signal for detection of the amount of received light having the wavelength to the colorimetric sensor 3. In this regard, the colorimetric sensor control part 42 may correct the control signal based on the detection signal of the gap detection unit 33 of the colorimetric sensor 3. Thereby, the voltage control unit 32 of the colorimetric sensor 3 sets the voltage applied to the electrostatic actuator 54 so that only the wavelength of the light desired by the user may be transmitted based on the control signal.

The colorimetric processing part 43 analyzes the chromaticity of the test object A from the amount of received light detected by the detection unit 31.

5. Advantages of Embodiment

As described above, in the tunable interference filter 5 of the embodiment, the fixed electrode 541 includes the first fixed partial electrode 543A and the second fixed partial electrode 543B insulated from each other, and the movable drive electrode 542 is formed in the ring shape including the first opposed drive region 544A opposed to the first fixed partial electrode 543A and the second opposed drive region 544B opposed to the second fixed partial electrode 543B. Further, the first lead drive electrode 545 is formed on the first fixed partial electrode 543A and the second lead drive electrode 546 is formed on the second fixed partial electrode 543B.

In the configuration, the first partial actuator 55A including the first fixed partial electrode 543A and the first opposed drive region 544A of the movable drive electrode 542 and the second partial actuator 55B including the second fixed partial electrode 543B and the second opposed drive region 544B of the movable drive electrode 542 may be driven by application of a drive voltage between the first drive electrode pad 545P of the first lead drive electrode 545 and the second drive electrode pad 546P of the second lead drive electrode 546.

Further, the fixed detection electrode 551 includes the first fixed partial detection electrode 553A and the second fixed partial detection electrode 553B insulated from each other, and the movable detection electrode 552 is formed in the ring shape including the first opposed detection region 554A opposed to the first fixed partial detection electrode 553A and the second opposed detection region 554B opposed to the second fixed partial detection electrode 553B. Further, the first lead detection electrode 555 is formed on the first fixed partial detection electrode 553A and the second lead detection electrode 556 is formed on the second fixed partial detection electrode 553B.

In the configuration, the gap dimension between the reflection films 56, 57 may be detected by detection of the capacitance between the first detection electrode pad 555P of the first lead detection electrode 555 and the second detection electrode pad 556P of the second lead detection electrode 556.

Further, the first lead drive electrode 545 and the second lead drive electrode 546 are formed on the fixed substrate 51 and connected to the first drive electrode pad 545P and the second drive electrode pad 546P formed on the outer peripheral edge of the fixed substrate 51, respectively.

Furthermore, the first lead detection electrode 555 and the second lead detection electrode 556 are formed on the fixed substrate 51 and connected to the first detection electrode pad 555P and the second detection electrode pad 556P formed on the outer peripheral edge of the fixed substrate 51, respectively.

Accordingly, in the case where the tunable interference filter 5 is incorporated into the colorimetric sensor 3, both when the lead wire 6 is connected via the conducting member 35 of Ag paste or the like and when the FPC 37 is connected via the anisotropic conducting layer 38, the wiring work may easily be performed from the movable substrate 52 side of the tunable interference filter 5. Further, if stress is applied to the fixed substrate 51 fixed to the fixing part 34, the stress is not applied to the movable substrate 52, and thus, no separation between the fixed substrate 51 and the movable substrate 52 or tilt of the movable substrate 52 occurs, and degradation in performance of the tunable interference filter may be prevented. Furthermore, wiring may be secured for the respective electrode pads 545P, 546P, 555P, 556P of the fixed substrate 51, and wiring reliability may be improved and reliability of the colorimetric sensor 3 and the colorimetric instrument 1 may also be improved.

Further, in the movable substrate 52, the cutout parts 524 are formed in correspondence with the locations of the electrode pads 545P, 546P, 555P, 556P. Accordingly, the movable substrate 52 does not become any obstruction to the wiring work, and wiring may be performed without application of stress to the movable substrate 52.

Furthermore, the width dimensions orthogonal to the circumference direction of the virtual circle Q and the substrate thickness direction in the respective partial actuators 55A, 55B are uniformly formed. Accordingly, in the respective partial actuators 55A, 55B, there is no irregularity in the electrostatic attractive force along the circumference direction, and the movable part 521 may be displaced with accuracy.

In addition, the first fixed partial electrode 543A and the second fixed partial electrode 543B of the fixed electrode 541 are formed in the same shape and provided in the locations in point symmetry with each other with respect to the center point O on the circumference of the virtual circle Q in the plan view. Further, the first partial actuator 55A including the first fixed partial electrode 543A and the first opposed drive region 544A and the second partial actuator 55B including the second fixed partial electrode 543B and the second opposed drive region 544B are electrically series-connected.

Accordingly, when a drive voltage is applied to the electrostatic actuator 54, electrostatic attractive forces having the same magnitude act on the respective partial actuators 55A, 55B. Therefore, even in the case where the gap between the fixed reflection film 56 and the movable reflection film 57 is varied, parallelism between the fixed reflection film 56 and the movable reflection film 57 may be maintained and reduction in resolution may be suppressed.

Further, the movable drive electrode 542 is formed in the ring shape along the circumference of the virtual circle Q on the holding part 522 of the movable substrate 52. That is, the movable drive electrode 542 is formed in point symmetry with respect to the center point of the movable part 521. Furthermore, in the movable substrate 52, the lead electrode extending from the movable drive electrode 542 or the like is unnecessary and membrane stress by the lead electrode is not generated.

Accordingly, the membrane stress of the movable drive electrode 542 acting on the holding part 522 becomes uniform, and the stress balance of the holding part 522 may uniformly be kept, and the tilt of the movable part 521 may be suppressed. Therefore, the gap dimension between the reflection films 56, 57 may be made uniform and resolution of the tunable interference filter 5 may be maintained with high accuracy.

The entire disclosure of Japanese Patent application No. 2011-085172, filed Apr. 7, 2011 is expressly incorporated by reference herein.

What is claimed is:

1. A tunable interference filter comprising:
a first substrate;
a second substrate opposed to the first substrate;
a first reflection film provided on the first substrate;
a second reflection film provided on the second substrate and opposed to the first reflection film via a gap;
an electrostatic actuator including a first drive electrode provided on the first substrate and a second drive electrode provided on the second substrate and opposed to the first drive electrode; and
a gap detection electrode including a first detection electrode provided on the first substrate and a second detection electrode provided on the second substrate and opposed to the first detection electrode,
wherein the first drive electrode includes a first partial drive electrode and a second partial drive electrode, the first and second partial drive electrodes being separate and apart from each other, and
the first detection electrode includes a first partial detection electrode and a second partial detection electrode, the first and second partial detection electrodes being formed on the first substrate, and being separate and apart from each other.

2. The tunable interference filter according to claim 1, wherein the first detection electrode and the first reflection film are provided on the same plane and the second detection electrode and the second reflection film are provided on the same plane.

3. The tunable interference filter according to claim 1, wherein the first partial detection electrode has an arc shape along a first virtual circle, and
the second partial detection electrode has an arc shape along the first virtual circle, and is formed in the same shape as that of the first partial detection electrode and provided in a location in point symmetry with the first partial detection electrode with respect to the center point of the movable part in the plan view.

4. An optical module comprising:
the tunable interference filter according to claim 1; and
a detection unit that detects light extracted by the tunable interference filter.

5. A photometric analyzer comprising:
the optical module according to claim 4; and
an analytical processing unit that analyzes light properties of the light based on the light detected by the detection unit of the optical module.

6. The tunable interference filter according to claim 1, wherein a capacitance between the first partial drive electrode and the second drive electrode and a capacitance between the second partial drive electrode and the second drive electrode are electrically series-connected; and
a capacitance between the first partial detection electrode and the second detection electrode and a capacitance between the second partial detection electrode and the second detection electrode are electrically series-connected.

7. The tunable interference filter according to claim 1, wherein the second substrate includes a movable portion, the second reflection film is provided on the movable portion, and the second detection electrode is ring-shaped and is formed on the movable portion.

8. A tunable interference filter comprising:
a first substrate;
a second substrate opposed to the first substrate;
a first drive electrode provided on the first substrate;
a second drive electrode provided on the second substrate and opposed to the first drive electrode;
a first detection electrode provided on the first substrate; and
a second detection electrode provided on the second substrate and opposed to the first detection electrode,
wherein the first drive electrode includes a first partial drive electrode and a second partial drive electrode, the first and second partial drive electrodes being separate and apart from each other, and
the first detection electrode includes a first partial detection electrode and a second partial detection electrode, the first and second partial detection electrodes being formed on the first substrate, and being separate and apart from each other.

9. The tunable interference filter according to claim 8, wherein a capacitance between the first partial drive electrode and the second drive electrode and a capacitance between the second partial drive electrode and the second drive electrode are electrically series-connected; and
a capacitance between the first partial detection electrode and the second detection electrode and a capacitance between the second partial detection electrode and the second detection electrode are electrically series-connected.

10. The tunable interference filter according to claim 8, wherein the second substrate includes a movable portion, the second reflection film is provided on the movable portion, and the second detection electrode is ring-shaped and is formed on the movable portion.

11. A tunable interference filter comprising:
a first substrate;
a second substrate opposed to the first substrate;
a first reflection film provided on the first substrate;
a second reflection film provided on the second substrate and opposed to the first reflection film via a gap;

an electrostatic actuator including a first drive electrode provided on the first substrate and a second drive electrode provided on the second substrate and opposed to the first drive electrode; and a gap detection electrode including a first detection electrode provided on the first substrate and a second detection electrode provided on the second substrate and opposed to the first detection electrode, wherein the second substrate includes a movable part provided with the second reflection film and a holding part that holds the movable part close to or away from the first substrate, in a plan view of the first substrate and the second substrate as seen from a substrate thickness direction, the movable part is formed in a circular shape and the holding part is formed along an outer circumference of the movable part, the first drive electrode includes a first partial drive electrode and a second partial drive electrode provided along a virtual circle around a center point of the movable part in the plan view, the first and second partial drive electrodes being separate and apart from each other, a first lead drive electrode extending from the first partial drive electrode toward an outer peripheral edge of the first substrate and a second lead drive electrode extending from the second partial drive electrode toward the outer peripheral edge of the first substrate are provided on the first substrate, the second drive electrode includes a first opposed drive region overlapping with the first partial drive electrode and a second opposed drive region overlapping with the second partial drive electrode in the plan view, the first detection electrode includes a first partial detection electrode and a second partial detection electrode provided along a virtual circle around the center point of the movable part in the plan view, the first and second partial detection electrodes being formed on the first substrate, and being separate and apart from each other, a first lead detection electrode extending from the first partial detection electrode toward the outer peripheral edge of the first substrate and a second lead detection electrode extending from the second partial detection electrode toward the outer peripheral edge of the first substrate are provided on the first substrate, and the second detection electrode includes a first opposed detection region overlapping with the first partial detection electrode and a second opposed detection region overlapping with the second partial detection electrode in the plan view.

12. The tunable interference filter according to claim 11, wherein the first detection electrode and the first reflection film are provided on the same plane and the second detection electrode and the second reflection film are provided on the same plane.

13. The tunable interference filter according to claim 11, wherein the first partial detection electrode has an arc shape along a first virtual circle, and the second partial detection electrode has an arc shape along the first virtual circle, and is formed in the same shape as that of the first partial detection electrode and provided in a location in point symmetry with the first partial detection electrode with respect to the center point of the movable part in the plan view.

14. An optical module comprising:
the tunable interference filter according to claim 11; and
a detection unit that detects light extracted by the tunable interference filter.

15. A photometric analyzer comprising:
the optical module according to claim 14; and
an analytical processing unit that analyzes light properties of the light based on the light detected by the detection unit of the optical module.

16. The tunable interference filter according to claim 11, wherein the second detection electrode is ring-shaped and is formed on the movable part of the second substrate.

17. A tunable interference filter comprising:
a first substrate;
a second substrate opposed to the first substrate;
a first drive electrode provided on the first substrate;
a second drive electrode provided on the second substrate and opposed to the first drive electrode;
a first detection electrode provided on the first substrate; and
a second detection electrode provided on the second substrate and opposed to the first detection electrode, wherein the first drive electrode includes a first partial drive electrode and a second partial drive electrode provided along a vertical circle in a plain view of the first substrate and the second substrate as seen from a substrate thickness direction, the first and second partial drive electrodes being separate and apart from each other, a first lead drive electrode extending from the first partial drive electrode toward an outer peripheral edge of the first substrate and a second lead drive electrode extending from the second partial drive electrode toward the outer peripheral edge of the first substrate are provided on the first substrate, the second drive electrode includes a first opposed drive region overlapping with the first partial drive electrode and a second opposed drive region overlapping with the second partial drive electrode in the plan view, the first detection electrode includes a first partial detection electrode and a second partial detection electrode provided along a virtual circle, the first and second partial detection electrodes being formed on the first substrate, and being separate and apart from each other, a first lead detection electrode extending from the first partial detection electrode toward the outer peripheral edge of the first substrate and a second lead detection electrode extending from the second partial detection electrode toward the outer peripheral edge of the first substrate are provided on the first substrate, and the second partial detection electrode has an arc shape along the first virtual circle, and is formed in the same shape as that of the first partial detection electrode and provided in a location in point symmetry with the first partial detection electrode with respect to the center point of the movable part in the plan view.

18. The tunable interference filter according to claim 17, wherein the second substrate includes a movable portion, the second reflection film is provided on the movable portion, and the second detection electrode is ring-shaped and is formed on the movable portion.

* * * * *